(12) United States Patent
Ducellier

(10) Patent No.: US 6,570,711 B2
(45) Date of Patent: May 27, 2003

(54) VIRTUAL WAVEPLATE AND OPTICAL CHANNEL INTERLEAVER FORMED THEREWITH

(75) Inventor: Thomas Ducellier, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 49 days.

(21) Appl. No.: 09/917,808

(22) Filed: Jul. 31, 2001

(65) Prior Publication Data

US 2002/0018300 A1 Feb. 14, 2002

Related U.S. Application Data (60) Provisional application No. 60/222,288, filed on Aug. 1, 2000.

(51) Int. Cl.[7] .................. G02B 27/14; G02B 27/28; G02F 1/035; H01S 3/00
(52) U.S. Cl. .................. 359/629; 359/618; 359/256; 359/281; 359/484; 359/495; 359/732; 385/2; 385/11; 372/703; 356/495
(58) Field of Search .................. 359/618, 629, 359/245, 246, 247, 256, 281, 280, 310, 484, 495, 496, 497, 732, 487; 385/2, 3, 8, 11, 18; 372/703, 33; 356/495

(56) References Cited

U.S. PATENT DOCUMENTS 4,872,755 A 10/1989 Küchel .................. 356/495
5,471,340 A 11/1995 Cheng et al. .................. 359/281
5,796,510 A * 8/1998 Yao .................. 359/256
6,498,680 B1 * 12/2002 Zhou et al. .................. 359/495

FOREIGN PATENT DOCUMENTS

| EP | 0 933 657 A2 | 4/1999 | G02B/6/293 |
| WO | WO 98/19415 | 7/1998 | H04J/14/00 |
| WO | WO 00/11510 | 2/2000 | G02B/6/293 |

* cited by examiner

Primary Examiner—Loha Ben
(74) Attorney, Agent, or Firm—Neil Teitelbaum (57) ABSTRACT

A conventional interleaver, based on a stack of waveplates, relies on the orientation and the birefringence of the waveplates to differentiate the polarizations of one set of channels from another, so that the one set of channels can be separated from the other. The present invention relates to a virtual waveplate that is used to replace a birefringent waveplate. A virtual waveplate imposes a phase delay between the extraordinary ray and the ordinary ray by separating one from the other and differentiating the actual path lengths taken thereby, before recombining them. An interleaver constructed with the virtual waveplates of the present invention can be substantially a-thermal and potentially chromatic dispersion free.

18 Claims, 5 Drawing Sheets

VIRTUAL WAVEPLATE AND OPTICAL CHANNEL INTERLEAVER FORMED THEREWITH

RELATED APPLICATIONS

The present application claims priority from the provisionally filed U.S. patent application Ser. No. 60/222,288, filed Aug. 1, 2000.

FIELD OF THE INVENTION

The present invention relates a device for imposing a retardance between orthogonally polarized components of an optical signal without the use of birefringent material, and in particular to a virtual waveplate that can be used in an optical channel interleaver.

BACKGROUND OF THE INVENTION

Optical multiplexers are used in the wavelength division multiplexing (WDM) of a plurality of optical channels for transmission via a single carrier fiber. At the receiving end of the fiber, the same general techniques are used to demultiplex the optical channels back into individual channels once again. Adding more channels to an optical signal increases the amount of data that can be sent down an optical network without the laying down of any additional fiber. The demand for additional capacity on current fiber networks keeps increasing, along with the demand for lower cost equipment to minimize initial capital costs, and less complicated equipment to reduce installation and maintenance costs.

One solution to the aforementioned problem includes the use of interleaver technology, and in particular to the birefringent waveplate-based interleaver technology disclosed in U.S. Pat. No. 4,566,761 issued Jan. 28, 1986; and U.S. Pat. No. 4,685,773 issued Aug. 11, 1987 both to Carlsen et al. Birefringent materials are relatively costly and temperature sensitive, moreover, there is a limit to the size that a single crystal can be grown, which could eventually restrict the capacity of the system. Other interleaver technologies are based on the Michelson interferometer, and include a Gires Tournois etalon in one arm (EP 933,657, filed Jan. 8, 1999 in the name of Dingel et al) or in both arms (U.S. Pat. No. 6,169,626 issued Jan. 2, 2001 in the name of Chen et al). Michelson Gires Tournois (MGT) interleavers are complicated to manufacture due to the high degree of accuracy required to match both of the arms thereof and to tune one or more cavities, which are temperature sensitive.

An object of the present invention is to overcome the shortcomings of the prior art by providing a less costly virtual waveplate that uses passive elements, which can be used in an interleaver device. Another object of the present invention is to increase the temperature stability of the waveplate assembly and to enable reflection losses to be minimized.

SUMMARY OF THE INVENTION

Accordingly, the present invention relates to a device for introducing a relative delay between orthogonally polarized components of an input signal comprising:
an input port for launching the input signal;
beam splitting means for dividing the input signal into first and second orthogonally polarized sub-beams, and for directing the first sub-beam along a first path and the second sub-beam along a second path;
first reflecting means in the first path for redirecting the first sub-beam back towards the beam splitting means;
delay means in the first path for imposing a relative delay between the first and second sub-beams;
second reflecting means in the second path for redirecting the second sub-beam back towards the beam splitting means for recombination with the first sub-beam; and
an output port for outputting the recombined first and second sub-beams.

Another aspect of the present invention relates to an optical filter comprising:
an first port for launching an input optical signal, which comprises a first and a second set of channels;
a second port for outputting the first set of channels;
a third port for outputting the second set of channels;
a first virtual waveplate; and
polarized beam separating means for directing the first set of channels to the second port, and for directing the second set of channels to the third port. The virtual waveplate comprises:
first beam splitting means for dividing the input signal into first and second orthogonally polarized sub-beams, and for directing the first sub-beam along a first path and the second sub-beam along a second path;
first reflecting means in the first path for redirecting the first sub-beam back towards the first beam splitting means;
second reflecting means in the second path for redirecting the second sub-beam back towards the first beam splitting means for recombination with the first sub-beam forming a first recombined signal; and
first delay means in the first path for imposing a first relative delay between the first and second sub-beams, whereby when the first and second sub-beams recombine, the first set of channels is orthogonally polarized relative to the second set of channels.

BRIEF DESCRIPTION OF DRAWINGS

This present invention will be more fully described with reference to the accompanying drawings, which illustrate preferred embodiments of the invention, wherein.

DETAILED DESCRIPTION

Figure 1:
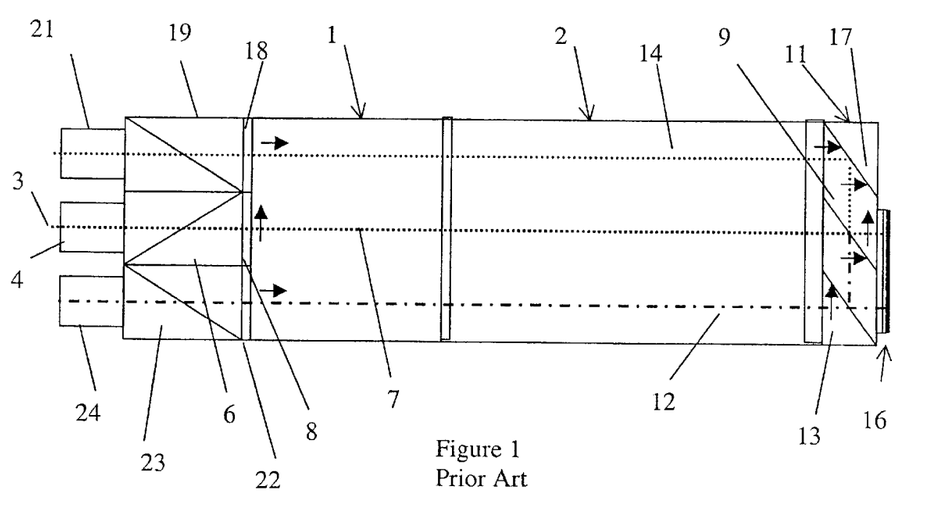
FIG. 1 is a schematic representation of a conventional birefringent waveplate-based interleaver.

With reference to FIG. 1, a conventional birefringent waveplate interleaver includes a first birefringent element 1 of length L and oriented with the optical axis at 45° with respect to the polarization of the input beam (vertical), and a second birefringent element 2 of length 2L and oriented with the optical axis at 105° with respect to the polarization of the input beam (vertical). The use of birefringent elements of length L and 2L is the optical version of adding the first harmonic frequency to the fundamental frequency to build a filter with a more square-shaped channel response. Of course, if an infinite number of the harmonics were added the result would be an ideal square shape. When in use as a de-interleaver, a beam of light 3 with mixed polarization and a series of channels is launched through collimating lens 4 into a polarization beam splitter 6, e.g. a rutile crystal. The polarization beam splitter 6 divides the beam of light 3 into two orthogonally polarized sub-beams 7, only one of which can be seen in FIG. 1. A half wave plate 8 is positioned in the path of one of the sub-beams, so that both sub-beams 7 will enter the first birefringent element 1 with the same polarization (e.g. vertical as shown in FIG. 1). After passing through the first and second birefringent elements 1 and 2, the state of polarization of the even channels in the sub-beams 7 effectively remains the same, while the state of polarization of the odd channels is rotated by 90°. Accordingly, when the sub-beams 7 pass through a middle section 9 of a stacked polarization beam splitter 11, the odd channels sub-beams 12 (only one shown) are reflected towards the bottom section 13, while the even channel sub-beams 14 (only one shown) are passed through middle section 9 to quarter wave plate mirror 16. The quarter wave plate mirror 16 rotates the polarization of the even channels 14 (e.g. vertical to horizontal) and reflects them back towards the middle section 9, whereby they are reflected to the top section 17 of the stacked polarization beam splitter 11. The even channels are reflected in the top section 17, and pass through the second and first birefringent elements 2 and 1 for a second time. Again, the even channels 14 exit the birefringent elements 1 and 2 with the same polarization as when they entered. A half wave plate 18 and a beam combiner 19, e.g. a rutile crystal, are used to combine the two even channel sub-beams 14 for output via focusing lens 21. Similarly, the odd channel sub-beams 12 get reflected in the bottom section 13 towards the quarter wave plate mirror 16, which rotates the polarization of the odd channel sub-beams 12 (e.g. from horizontal to vertical), whereby they pass through the bottom section 13 and back through the second and first birefringent elements 2 and 1 for a second time. Again, the odd channel sub-beams 12 exit the birefringent elements 1 and 2 with polarizations orthogonal to each other when they entered, e.g. vertical to horizontal. A half wave plate 22 and a beam combiner 23, e.g. a rutile crystal, are used to combine the odd channel sub-beams 12 for output via lens 24.

Figure 2:
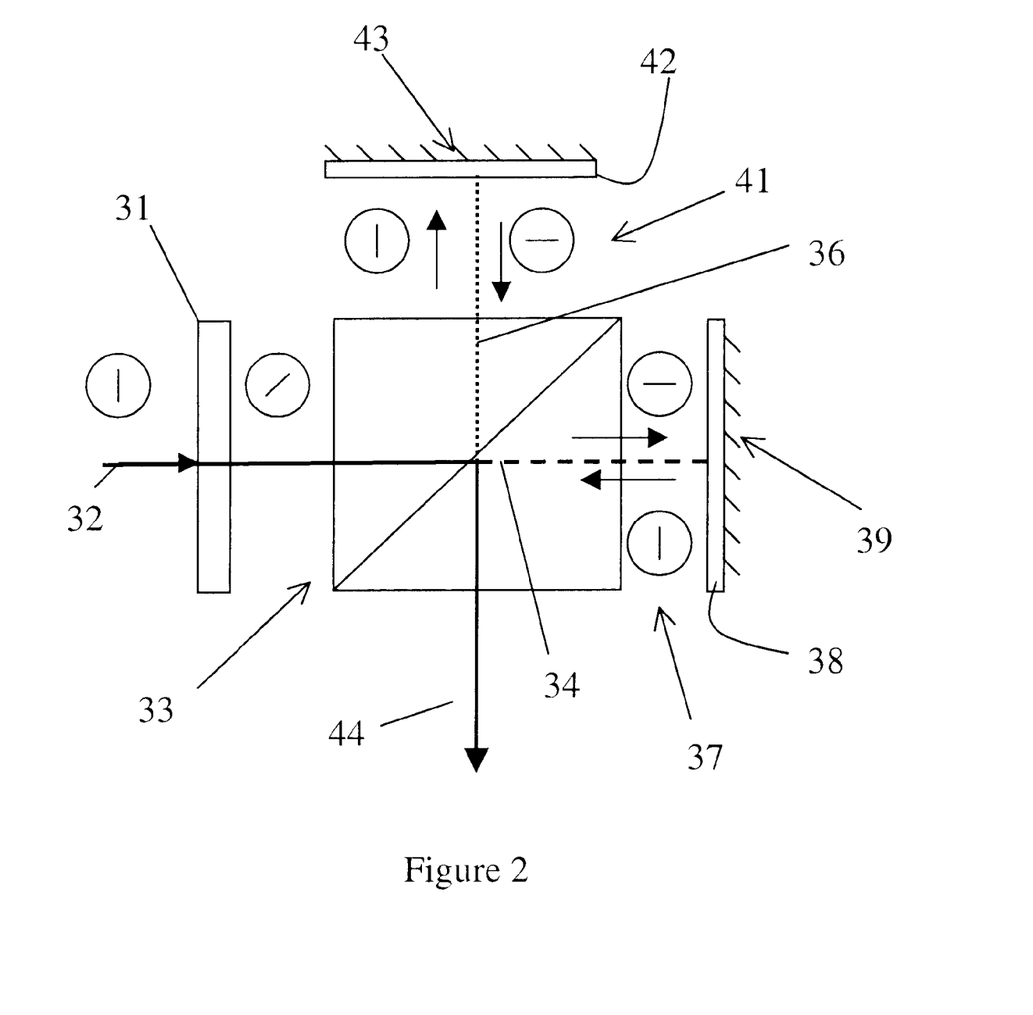
FIG. 2 is a schematic representation of a virtual waveplate according to the present invention.

With reference to FIG. 2, the virtual waveplate according to the present invention includes a half waveplate 31 oriented at an angle of 22.5° relative to an input beam 32 of polarized light providing a rotation of 45° thereto. The input beam 32 can be either horizontally or vertically polarized; however in the illustrated example the input beam 32 is vertically polarized. Moreover, the waveplate 31 can be eliminated if the light is input in the appropriate state of polarization. A polarization beam splitter (PBS) 33 splits the input beam 32 into an s-polarized (horizontal) sub-beam 34, which passes straight through the PBS 33, and a p-polarized (vertical) sub-beam 36, which is reflected in the PBS 33. The PBS is preferably comprised of two triangular prisms with a polarization sensitive coating therebetween. The s-polarized (horizontal) sub-beam 34 traverses a gap 37 of length d1 until being intercepted by a quarter wave plate 38 with a reflective rear surface 39. Two passes through the quarter wave plate 38 result in a 90° rotation of the polarization of the sub-beam 34, e.g. from horizontal to vertical, whereby when the sub-beam 34 re-enters the PBS 33 it gets reflected. Similarly, p-polarized sub-beam 36 traverses a gap 41 of length d2 until being intercepted by a quarter wave plate 42 with a rear reflective surface 43. Accordingly, the p-polarized sub-beam 36 is reflected back towards the PBS 33 after a cumulative rotation of 90°, so that the PBS 33 will pass the sub-beam 36 therethrough for interference with the reflected sub-beam 34 forming combined beam 44. Therefore, the s-polarized (vertical) sub-beam and the p-polarized (horizontal) sub-beam have retardance between them defined by the difference between d1 and d2, thereby providing the virtual equivalent of a waveplate. In practice d1 or d2 can be equal to zero, whereby the difference would be d1 or d2.

Since this device provides different paths for the o and e waves, surfaces in the path of the o waves can be coated with a different antireflective coating than the surfaces in the path of the e waves. Therefore, the effectiveness of the anti-reflective coatings can be maximized in each path, rather than having to compromise the effectiveness of the coating when both types of waves travel both paths. Moreover, this system is athermal, since the path difference is provided in air, not in some other material substance more susceptible to thermal expansion.

Figure 3:
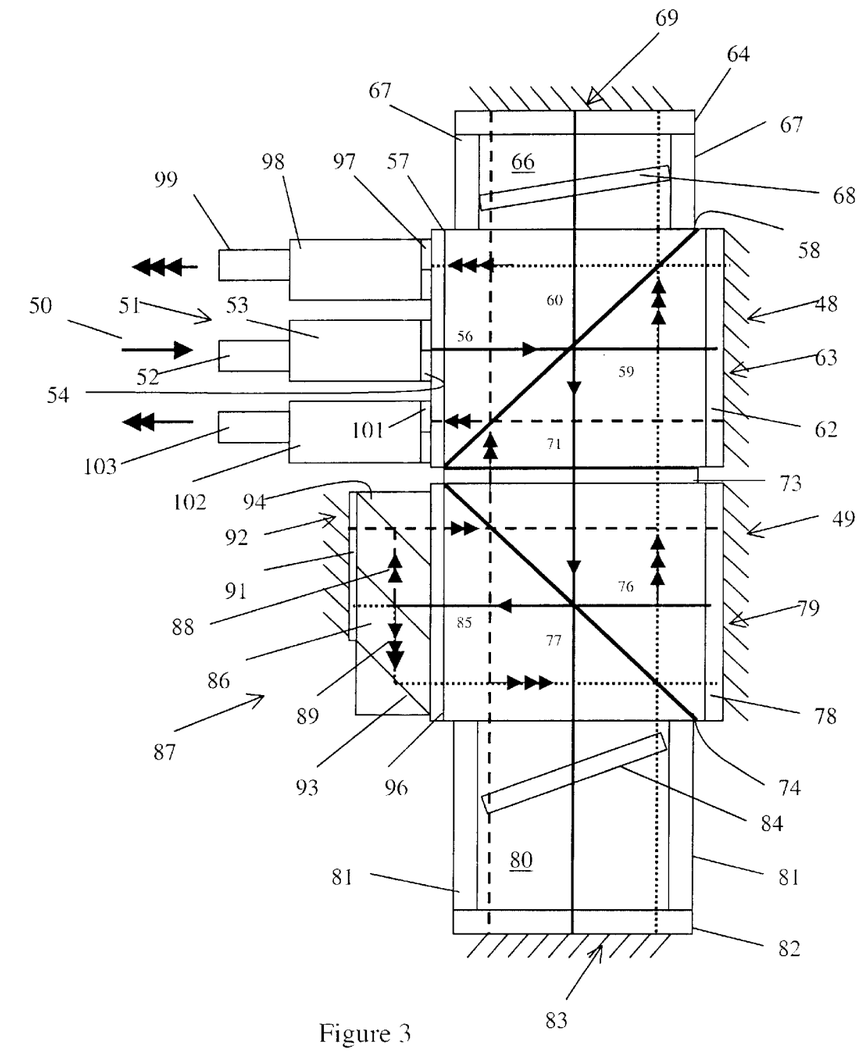
FIG. 3 is a schematic representation of the dual-pass interleaver including the virtual waveplate of FIG. 2 illustrating the beam paths.

With reference to FIG. 3, two of the aforementioned virtual wave plates 48 and 49 of FIG. 2 are arranged in an interleaver device as substitutes for the birefringent elements 1 and 2 from FIG. 1. This configuration yields a flattop interleaver because the path lengths d1 and d2 of this system are set to give the fundamental and first harmonic from lengths L and 2L, which are selected to provide the desired channel spacing. It is well known that the summation of a fundamental and the odd harmonics of the fundamental, yields a square wave response, and that a summation of the fundamental and first harmonic gives a good approximation of a square wave response, i.e. a flattop filter.

Figure 4:
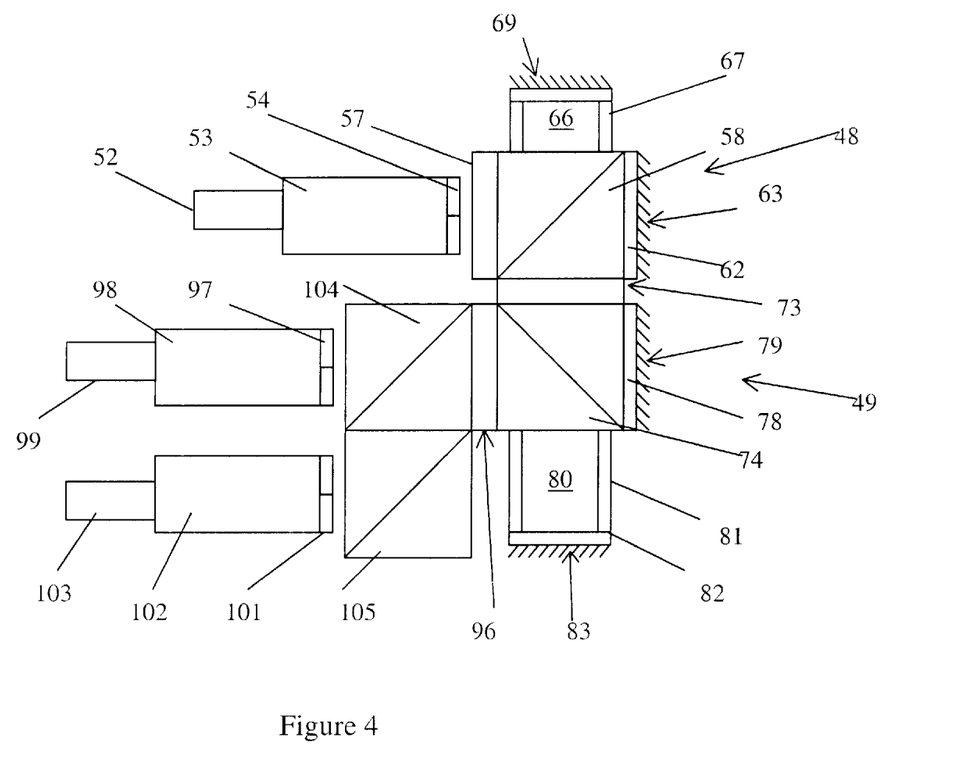
FIG. 4 is a schematic representation of another embodiment of an interleaver, which includes the virtual waveplate according to FIG. 2.
Figure 5:
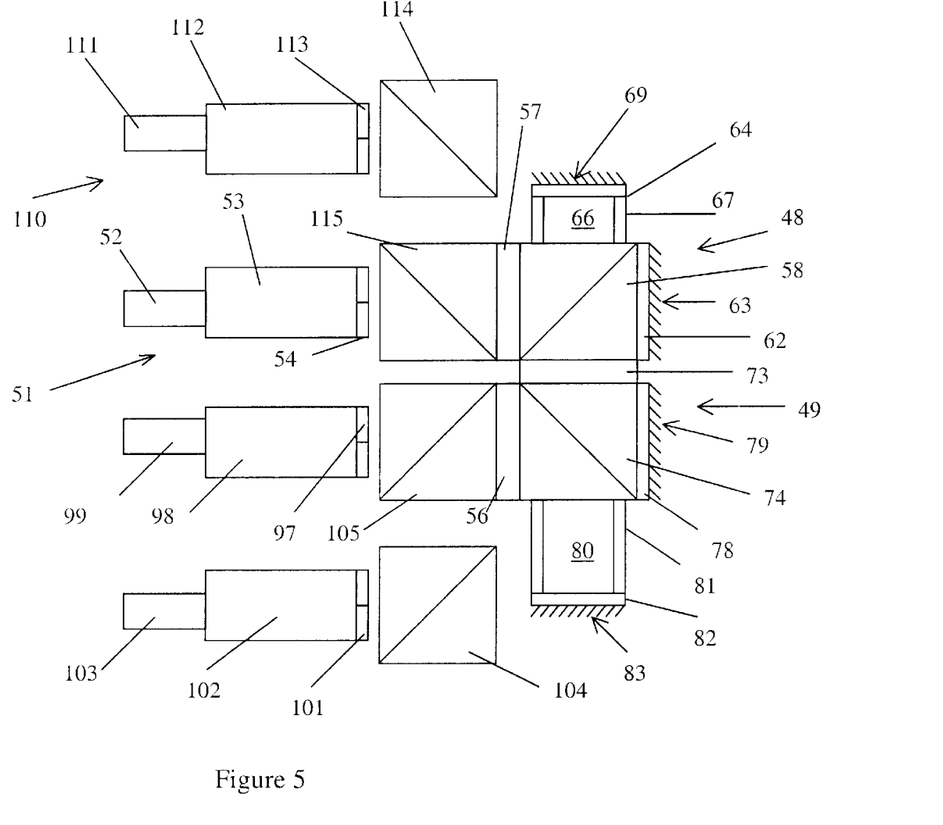
FIG. 5 is a schematic representation of a dual-input interleaver, which includes the virtual waveplate according to FIG. 2.

When the illustrated interleaver device is used for de-interleaving optical channels, a beam of light 50 of mixed polarization comprising a plurality of channels is launched through input port 51. Port 51 comprises a lens 52, preferably a graded index (GRIN) lens, a beam splitter 53, preferably a rutile crystal, and a polarization rotator 54, preferably a half wave plate. Please note: in drawings 3,4 and 5 polarization rotators 54 are shown in side view for clarity, while the remainder of the figure is in plan view. The beam splitter 53 separates the input beam 50 into two orthogonally polarized sub-beams 56 (only one of which can be seen in the Figure), and the polarization rotator 54 rotates the polarization of one of the sub-beams 56 so that both of the sub-beams 56 have the same polarization. As described above, the input sub-beams 56 are passed through a half-wave plate 57 oriented at an angle of 22.5° thereto, resulting in the state of polarization of the sub-beams 56 being rotated by 45°. A PBS 58 splits the sub-beams 56 into horizontally polarized sub-beams 59, which get passed therethrough, and vertically polarized sub-beams 60, which get reflected thereby. The horizontally polarized sub-beams 59 are directed through a quarter wave plate 62, and get reflected back by a reflective surface 63. The double pass through the quarter wave plate 62 results in the horizontally polarized sub-beams becoming vertically polarized, whereby they get reflected by the PBS 58 rather than passed therethrough. The quarter wave plate 62 is fixed to the side of the PBS 58 making the length d1=0. The vertically polarized sub-beams 60 pass through a quarter wave plate 64 after traversing a gap 66 of length d2=L defined by spacers 67. A shear plate 68 is positioned in the gap 66 to enable minor adjustments to the optical path length. The sub-beams 60 get directed back through the PBS 58 by a reflective coating 69 on the quarter wave plate 64 after the state of polarization has been rotated by 90°. Accordingly, the two sets of sub-beams 59 and 60 recombine into sub-beams 71 and are directed to the second virtual wave plate 49.

The recombined sub-beams 71 pass through a half wave plate 73, which is oriented at an angle of 52.5°, before entering a PBS 74. The PBS 74 again splits the sub-beams 71 into orthogonally polarized sets of sub-beams 76 and 77. Sub-beams 76 pass through quarter wave plate 78 and are directed back by reflective surface 79 after a 90° rotation. Sub-beams 77 traverse a gap 80 of length 2L, defined by spacers 81, and pass through quarter wave plate 82. A reflective surface 83 on the quarter wave plate 82 directs the sub-beams 77 back through the PBS 74 for recombination with sub-beams 76. A sheer plate 84 positioned in the gap 80 enables minor adjustments to be made to the optical path length of the sub-beams 77. A half wave plate 96, oriented at an angle of 3.5°, is positioned between the PBS 87 and the second virtual waveplate 49 for making a minor adjustment to the state of polarization of the sub-beams passing therethrough.

Due to the appropriate phase delays caused by the gaps 66 and 80, and the orientations of the waveplates 57, 73 and 96, the channels in the recombined sub-beams 85 have states of polarization that alternate between vertical and horizontal. Accordingly, by passing the recombined beam 85 through the middle section 86 of a stacked PBS 87, the even number channels 88 can be separated from the odd number channels 89.

The odd channels 89, which have become horizontally polarized, pass through the middle section 86 of the PBS 87. A quarter wave plate 91, with a reflective coating 92, is positioned in the path of the odd channels 89 for redirecting them back through the middle section 86 of the PBS 87 after a 90° rotation of their state of polarization. The odd channels 89, which are now vertically polarized, are reflected by the middle section 86 towards a lower section 93 of PBS 87, which in turn reflects the odd channels 89 back through the half wave plate 96 into the second virtual waveplate 49.

The even channels 88, the polarization of which has not been effectively changed, are initially vertically polarized, and get reflected by the middle section 86 of the PBS 87 towards an upper section 94. The upper section 94 reflects the even channels 88 towards the quarter wave plate mirror 91, which reflects the even channels back through the upper section 94 after a 90° rotation. The even channels 88, now horizontally polarized, pass straight through the upper section 94 and back through the waveplate 96 into the second virtual waveplate 49.

In the preferred embodiment illustrated in FIG. 3, the odd channels 89 (represented by the three headed arrows) and the even channels 88 (represented by the two headed arrows) make a second pass through the second and first virtual waveplates 49 and 48 along paths separate from each other and from the path taken during the first pass. By rotating the state of polarization of the odd channels 89 and the even channels 88 between passes, the system becomes chromatic dispersion free. The odd channels 89 travel from the second virtual waveplate 49 to the first virtual waveplate 48, and undergo a 90° change in their state of polarization, whereby both of the odd channel sub-beams 89 exit the first virtual waveplate 48 horizontally polarized. A half wave plate 97 is positioned in the path of one of the odd channel sub-beams 89 for rotating the state of polarization thereof by 90°. The, now, orthogonally polarized odd channel sub-beams exit a first output port, during which they are combined in a beam combining walk-off crystal 98, and focused by lens 99.

Similarly, the even number channels 88 are routed from the second virtual waveplate to the first virtual waveplate; however, as before, this does not result in a change in their state of polarization. In a second output port, a half-wave plate 101 rotates the polarization of one of the even channel sub-beams 88, so that a beam-combining walk-off crystal 102 can combine the pair of sub-beams 88 for output via focusing lens 103.

When used for interleaving channels the opposite occurs, whereby odd channels input through lens 99 are mixed with even channels input via lens 103 for output through port 51.

The structure of the single pass embodiment illustrated in FIG. 4 is identical to the aforementioned double pass embodiment illustrated in FIG. 3, except that a pair of PBS 104 and 105 replaces the stacked PBS 87. As above, a signal with mixed polarization is launched via lens 52, and divided into orthogonally polarized sub-beams by beam separating walk-off crystal 53. The polarization of one of the sub-beams is rotated by 90° in half-wave plate 54, and the two similarly polarized sub-beams are directed through the first and second virtual waveplates 48 and 49. A signal having odd channels orthogonally polarized to the even channels exits the second virtual waveplate 49 through the waveplate 96 and penetrates the PBS 104. The odd channels pass to the beam combiner 98 for output via lens 99, after the polarization of one of the odd channel sub-beams is rotated by the half-wave plate 97. The even channels are reflected by the PBS 104 towards the other PBS 105, which directs the even channels through the half-wave plate 101 and beam combining walk-off crystal 102 for output via lens 103.

The embodiment illustrated in FIG. 5 includes an additional input port 110, which includes a collimating lens 111, and beam separating walk-off crystal 112, and a half-wave plate 113. The half-wave plate 113 is positioned in the path of the separated sub-beams from the walk-off crystal 112 so that both sub-beams have the same polarization and so that the polarization of both sub-beams is orthogonal to the sub-beams entering from the first input port 51. This arrangement enables the sub-beams entering the second port 110 to be reflected by a PBS 114 towards another PBS 115. PBS 115 is positioned between the first input port 51 and the first virtual waveplate 48, whereby the sub-beams from the first input port 51 are combined with the orthogonally polarized sub-beams from the second input port 110. Since the channels from the first input port 51 are orthogonal to the channels from the second input port 110, and since the polarization of the odd channels is rotated by 90° and the polarization of the even channels is not, this arrangement enables the odd channels input via the first input port 51 to be mixed with the even channels input via the second input port 110. Of course, various other scenarios are possible dependant upon which channels are input via which input port.

The virtual waveplate assemblies, constructed in the above-described preferred embodiments, allow for ITU tuning; however, other assemblies with different waveplate arrangements are possible. To ensure that the assembly is not temperature sensitive, it is preferable to construct the spacers 67 and 81 from an ultra low expansion material, e.g. Zerodur™, and to make the PBS's balanced fused silica beam splitter cubes.

Furthermore, since the above-identified assembly splits the ordinary wave (o-wave) and the extraordinary wave (e-wave), different anti-reflective coatings can be used on the surfaces of the different materials in accordance with the characteristics of the appropriate sub-beam to maximize the through put of light intensity.

I claim:

1. A device for introducing a relative delay between orthogonally polarized components of an input signal comprising:

an input port for launching the input signal;

beam splitting means for dividing the input signal into first and second orthogonally polarized sub-beams, and for directing the first sub-beam along a first path and the second sub-beam along a second path;

first reflecting means in the first path for redirecting the first sub-beam back towards the beam splitting means;

delay means in the first path for imposing a relative delay between the first and second sub-beams;

second reflecting means in the second path for redirecting the second sub-beam back towards the beam splitting means for recombination with the first sub-beam; and an output port for outputting the recombined first and second sub-beams;

wherein the beam splitting means is a polarization beam splitting cube; and wherein the polarization beam splitting cube and the first and second polarization rotating means have anti-reflection coatings thereon, which are selected based on the polarization of the sub-beam passing therethrough.

2. The device according to claim 1, wherein the relative delay is a time delay; and wherein the delay means is an optical path length difference between the first and second paths.

3. The device according to claim 2, wherein the first reflecting means is positioned a different distance away from the beam splitting means than the second reflecting means, whereby the first path has a different path length than the second path.

4. The device according to claim 1, further comprising first polarization rotating means in the first path for rotating the polarization of the first sub-beam by 90°; and second polarization rotating means in the second path for rotating the polarization of the second sub-beam by 90°.

5. The device according to claim 4, wherein the first polarization rotating means is a first quarter waveplate disposed in the first path, whereby the first sub-beam traverses the first quarter waveplate twice; and wherein the second polarization rotating means is a second quarter waveplate disposed in the second path, whereby the second sub-beam traverses the second quarter waveplate twice.

6. The device according to claim 1, further comprising a waveplate for orienting the polarization of a linearly polarized beam at 45° relative to the beam splitting means, thereby forming the input signal.

7. An optical filter comprising:

a first port for launching an input optical signal, which comprises a first and a second set of channels;

a second port for outputting the first set of channels;

a third port for outputting the second set of channels;

a first virtual waveplate comprising:

first beam splitting means for dividing the input signal into first and second orthogonally polarized sub-beams, and for directing the first sub-beam along a first path and the second sub-beam along a second path;

first reflecting means in the first path for redirecting the first sub-beam back towards the first beam splitting means;

second reflecting means in the second path for redirecting the second sub-beam back towards the first beam splitting means for recombination with the first sub-beam, forming a first recombined signal; and first delay means in the first path for imposing a first relative delay between the first and second sub-beams, whereby when the first and second sub-beams recombine, the first set of channels is orthogonally polarized relative to the second set of channels; and polarized beam separating means for directing the first set of channels to the second port, and for directing the second set of channels to the third port.

8. The device according to claim 7, wherein the first relative delay is a time delay; and wherein the first delay means is an optical path length difference between the first and second paths.

9. The device according to claim 8, wherein the first reflecting means is positioned a different distance away from the first beams splitting means than the second reflecting means, whereby the first path has a different path length than the second path.

10. The device according to claim 9, further comprising first polarization rotating means in the first path for rotating the polarization of the first sub-beam by 90°; and second polarization rotating means in the second path for rotating the polarization of the second sub-beam by 90°.

11. The device according to claim 7, further comprising:

a second virtual waveplate between the first virtual waveplate and the polarized beam separating means comprising:

polarization adjustment means for rotating the polarization of the recombined signal;

second beam splitting means for dividing the recombined signal into third and fourth orthogonally polarized sub-beams, and for directing the third sub-beam along a third path and the fourth sub-beam along a fourth path;

third reflecting means in the third path for redirecting the third sub-beam back towards the second beam splitting means;

fourth reflecting means in the fourth path for redirecting the fourth sub-beam back towards the second beam splitting means for recombination with the third sub-beam, forming a second recombined signal; and second delay means in the third path for imposing a second relative delay between the third and fourth sub-beams, whereby, when the third and fourth sub-beams recombine, the first set of channels is orthogonally polarized relative to the second set of channels.

12. The device according to claim 11, wherein the first delay means is an optical path length difference between the first and second paths, whereby the first path has an optical path length L longer than the second path; and wherein the second delay means is an optical path length difference between the third and fourth paths, whereby the fourth path has an optical path length 2L longer than the third path.

13. The device according to claim 12, wherein the first reflecting means is separated from the first beam splitting means by a distance L longer than a distance separating the second reflecting means and the first beam splitting means; and wherein the fourth reflecting means is separated from the second beam splitting means by a distance 2L longer than a distance separating the third reflecting means and the second beam splitting means.

14. The device according to claim 11, further comprising;

first polarization rotating means in the first path for rotating the polarization of the first sub-beam by 90°;

second polarization rotating means in the second path for rotating the polarization of the second sub-beam by 90°, whereby the first beam splitting means directs the first recombined signal towards the second virtual waveplate;

third polarization rotating means in the third path for rotating the polarization of the third sub-beam by 90°;

fourth polarization rotating means in the fourth path for rotating the polarization of the fourth sub-beam by 90°, whereby the second beam splitting means directs the second recombined signal towards the polarized beam separating means.

15. The device according to claim 14, wherein the first and second beam splitting means, and the first, second, third and fourth polarization rotating means have anti-reflection coatings thereon, which are selected based on the polarization of the sub-beam passing therethrough.

16. The device according to claim 11, further comprising: a fourth port for launching a secondary input optical signal; and beam combining means for combining the input optical signal and the secondary input optical signal before entering the first virtual waveplate.

17. The device according to claim 11, further comprising:

fifth reflecting means for directing the first set of channels back through the second and subsequently the first virtual waveplates;

fifth polarization rotating means for rotating the polarization of the first set of channels, whereby the state of polarization of the first set of channels entering the second virtual waveplate for a second time is orthogonal to the state of polarization of the first set of channels exiting the second virtual waveplate after a first pass therethrough;

sixth reflecting means for directing the second set of channels back through the second and subsequently the first virtual waveplates; and sixth polarization rotating means for rotating the polarization of the second set of channels, whereby the state of polarization of the second set of channels entering the second virtual waveplate for a second time is orthogonal to the state of polarization of the second set of channels exiting the second virtual waveplate after a first pass therethrough.

18. The device according to claim 7, wherein the first port comprises:

a birefringent crystal for splitting the input beam into a pair of beams having orthogonal polarizations; and a half-wave plate for rotating the polarization of one of the pair of beams, whereby the pair of beams has parallel polarizations; and wherein the second and third ports each comprise:

a half-wave plate for rotating the polarization of one of a pair of beams having parallel polarizations forming a pair of beams with orthogonal polarizations; and a birefringent crystal for combining the pair of beams with orthogonal polarizations.

* * * * *